United States Patent [19]

Raffauf et al.

[11] 4,019,012

[45] Apr. 19, 1977

[54] WELDING APPARATUS

[75] Inventors: Alois Raffauf, Koblenz-Kesselheim; Eduard Wolfle, Mulheim-Karlich, both of Germany

[73] Assignee: Girling Limited, Birmingham, England

[22] Filed: Apr. 8, 1975

[21] Appl. No.: 566,074

[30] Foreign Application Priority Data

Apr. 9, 1974 United Kingdom ............ 15724/74
Nov. 22, 1974 United Kingdom ............ 50675/74

[52] U.S. Cl. .................................. 219/79; 219/84; 219/103; 219/107; 219/120; 219/159; 269/25; 269/321 B
[51] Int. Cl.² ...................... B23K 11/06; B23Q 3/00
[58] Field of Search .................. 219/79, 80, 81, 84, 219/103, 107, 119, 120, 159; 269/25, 153, 321 B

[56] References Cited

UNITED STATES PATENTS

| 1,681,604 | 8/1928 | Winter ................................. 219/81 |
| 1,868,782 | 7/1932 | Whitworth et al. ................. 219/80 |
| 2,730,600 | 1/1956 | Fisher et al. ......................... 219/84 |
| 3,382,341 | 5/1968 | Moore ........................... 219/107 X |
| 3,475,303 | 10/1969 | Sadler et al. .................... 269/25 X |

*Primary Examiner*—J. V. Truhe
*Assistant Examiner*—N. D. Herkamp
*Attorney, Agent, or Firm*—Scrivener Parker Scrivener and Clarke

[57] ABSTRACT

A welding apparatus for welding together arcuate components, for example a platform and web of a brake shoe comprises a pair of opposed clamping members which are relatively movable to engage the web, one on each side thereof, over a substantial portion of the web surface area. The clamping members are continuously rotated by suitable drive arrangement. Preferably, two such pairs of clamping members are provided for clamping respective webs.

13 Claims, 14 Drawing Figures

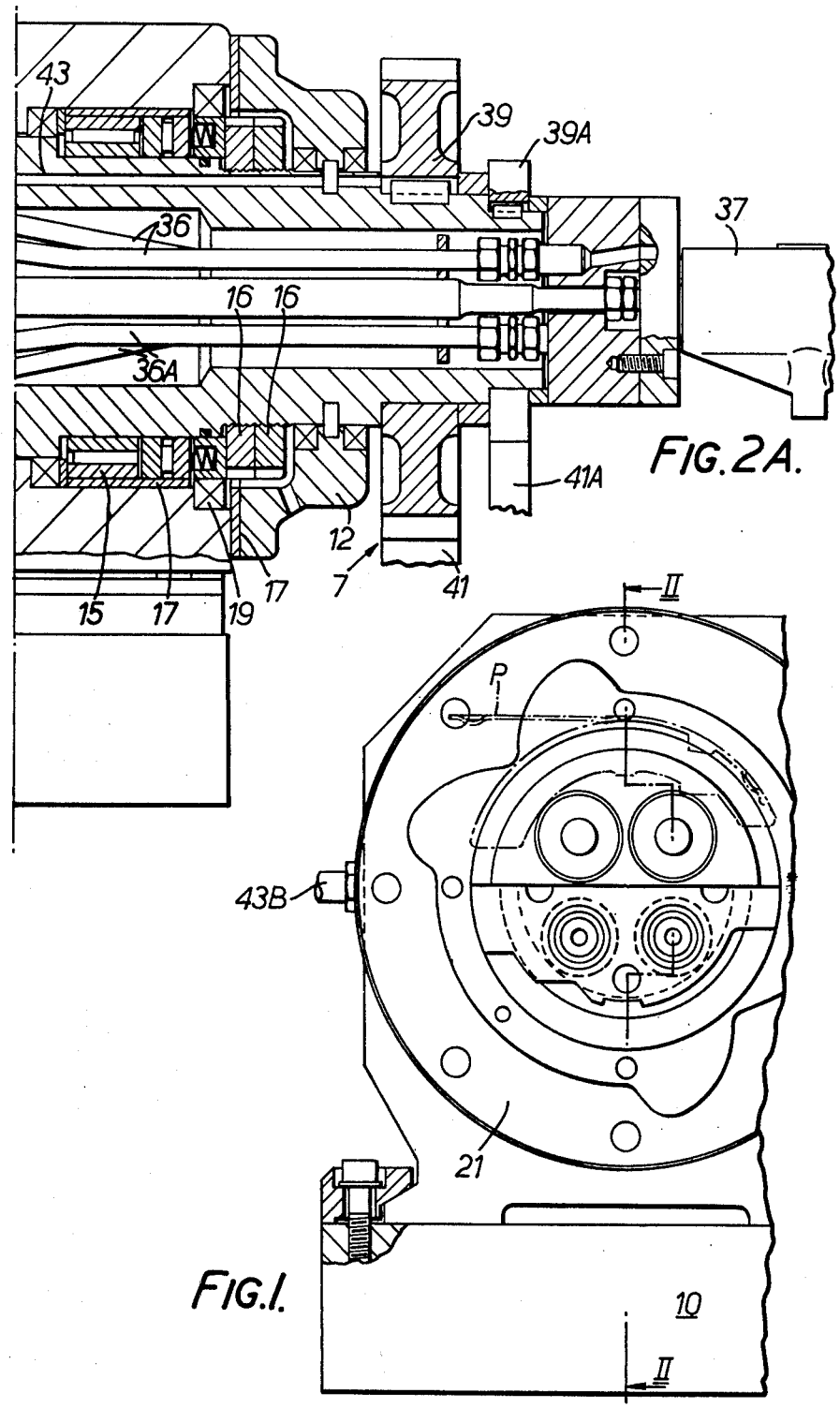

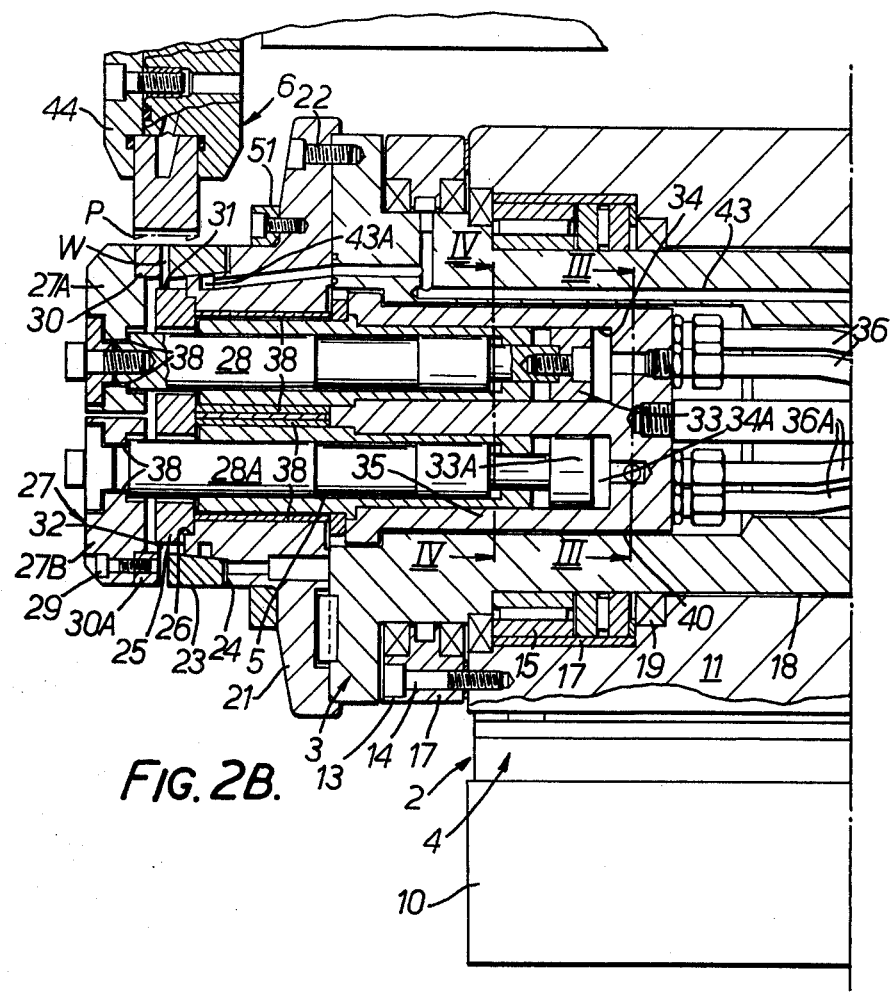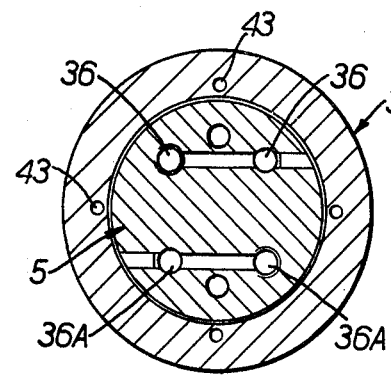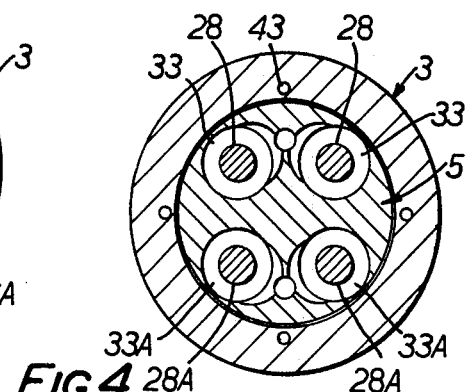

WELDING APPARATUS

This invention relates generally to welding apparatus and is primarily concerned with the welding together of arcuate components, for example a platform and a web of a brake shoe.

Such apparatus has been proposed in which the platform and web are held in engagement with each other and an electric current is conducted intermittently through them to an electrode which moves relative to the web/platform combination. The current is passed when the electrode is in register with preformed projections on the platform so that the platform and web are projection welded together at selected arcuately spaced points.

In one previously proposed form of apparatus the web is held in a welding clamp comprising a drive wheel and a driven wheel between which the web is clamped, and a top follower electrode roller which is located adjacent the periphery of the welding clamp. The platform is fed between the top roller and the welding clamp and as it is fed, current is intermittently conducted through the web and platform to the electrode to weld the platform to the web. In this apparatus the clamp is rotated through about 180° during the welding operation, the welded platform/web combination released, the rotational movement stopped, another web inserted and the operation repeated. The current is conducted to the web from a transformer through a flexible lead to a pair of bushes pressed against a copper shaft of the driven roller.

In a modified form of the previously proposed apparatus the drive and driven rollers have their axes offset by about 1°. The rollers are rotated continuously and the web fed between and pinched by the rollers and rotated with the rollers during the welding operation. When the web has passed completely through the pinching station, where the rollers are closest together, it is released. In this form of apparatus the electric current is not conducted through a shaft but through two relatively rotatable plates in face-to-face contact, one of the plates being fixed and the other coupled to one of the rollers.

The first-mentioned form of previously proposed apparatus has the disadvantages that operation is intermittent, the apparatus having to be stopped to feed and release the web from the welding clamp. The modified form of apparatus has the disadvantage that the wheels have only line contact with the web so that the pinching of the web makes indentations thereon.

In accordance with the present invention, there is provided a welding apparatus for welding together a platform and an arcuate web of a brake shoe, comprising web clamping means having a pair of opposed clamping members and operable to engage the clamping members with the web one on each side thereof over a substantial portion of the web surface area, and drive means arranged to continuously rotate the clamping means.

Preferably, the clamping means has two independently operable parts so that while a web is clamped in one part for a welding operation, a previously welded web/platform combination can be released from the other part and a web fed into the other part for the next succeeding welding operation.

Two forms of welding apparatus in accordance with the invention for welding together a platform and a web of a brake shoe will now be described, by way of example, with reference to the accompanying drawings in which:

FIG. 1 is a part elevation end view of one form of apparatus;

FIGS. 2A and 2B are axial sections taken on the line II—II of FIG. 1;

FIG. 3 is a section taken along the line III—III of FIG. 2;

FIG. 4 is a sectional view taken along the line IV—IV of FIG. 2;

Figure 5:
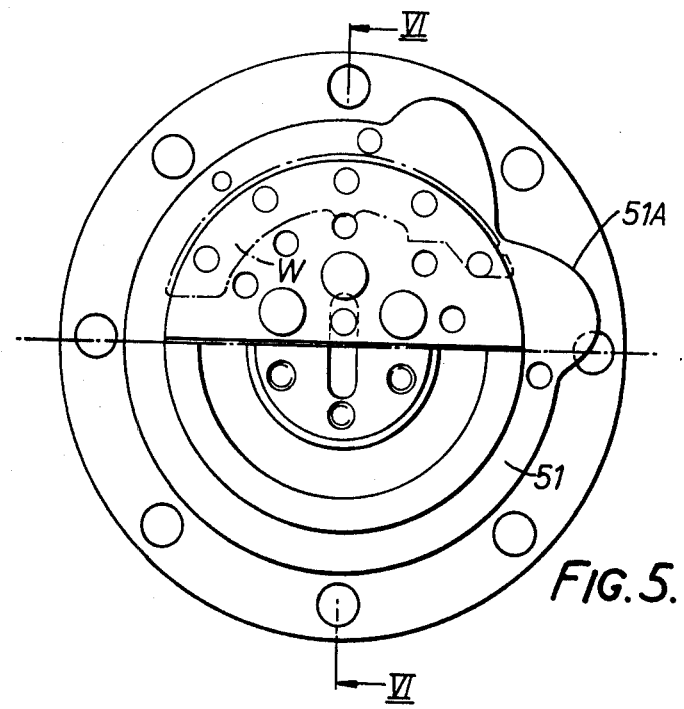
FIG. 5 is an elevation end view of the other form of apparatus.
Figure 7:
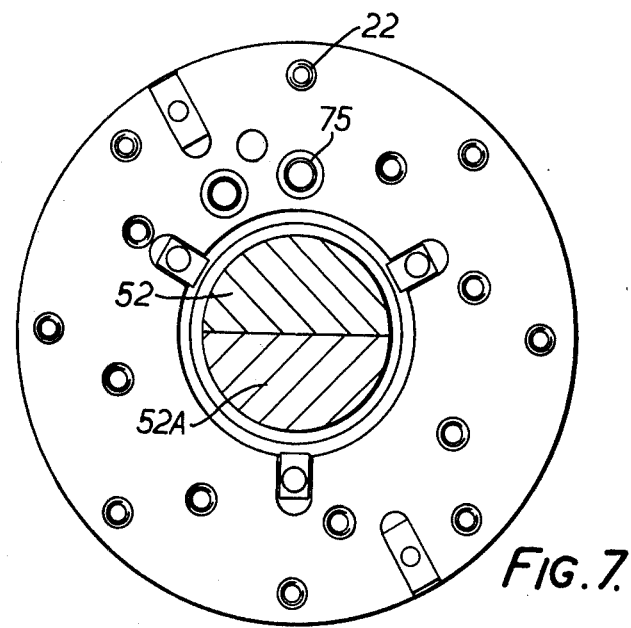
FIG. 7 is a section taken on the line VII—VII of FIG. 6.
Figure 6A:
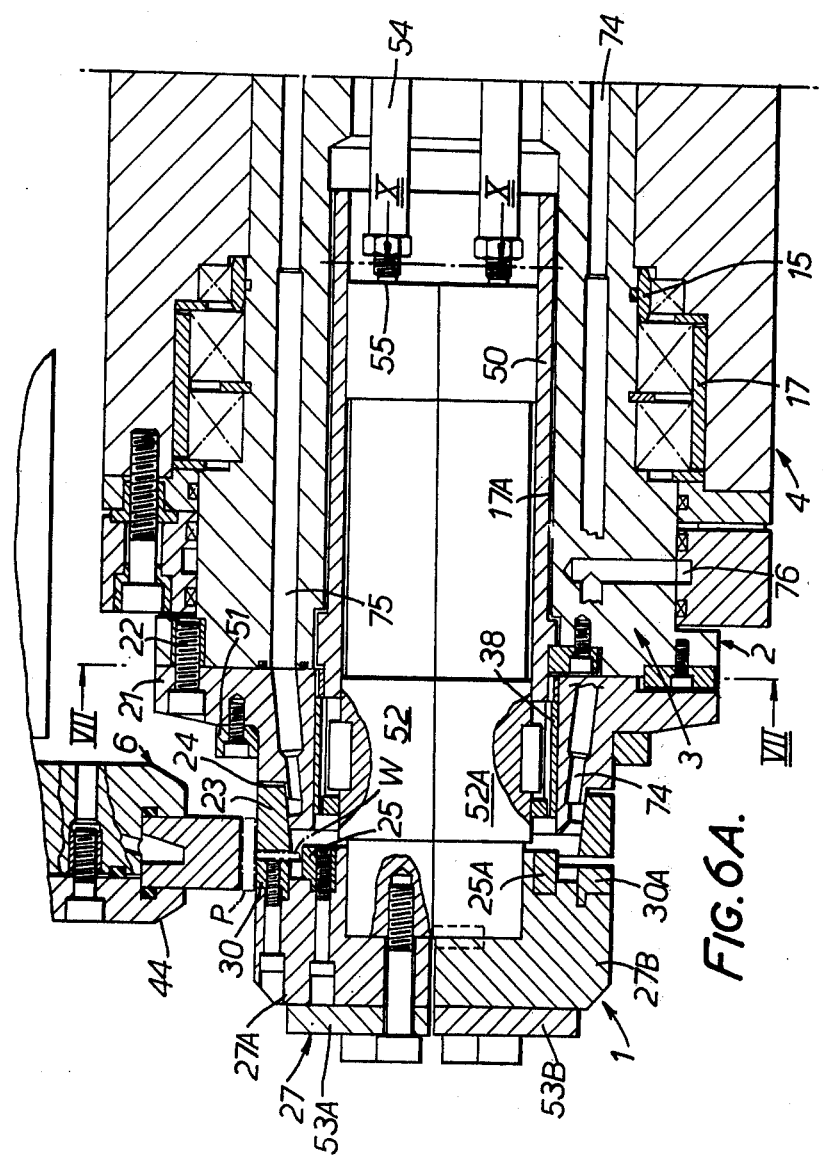
FIGS. 6A and 6B are axial sections taken on the line VI—VI of FIG. 5.
Figure 6B:
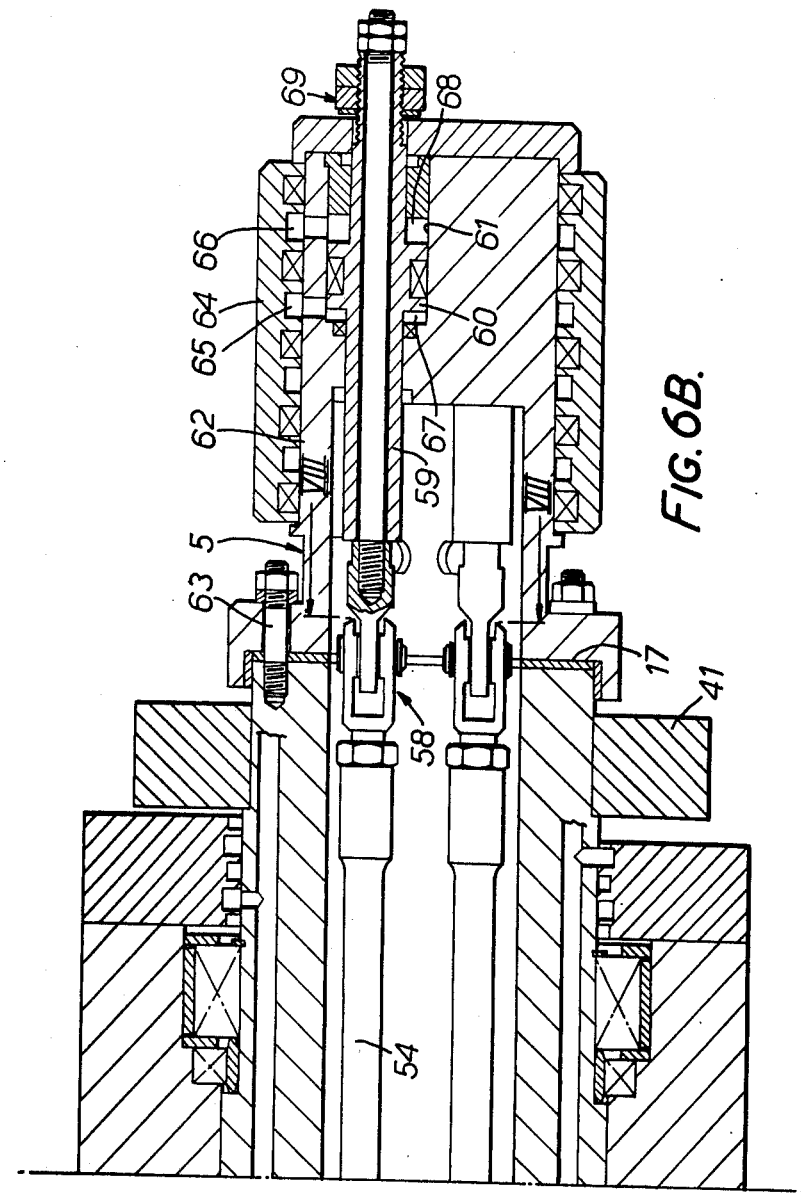

Briefly, each form of apparatus comprises a rotatable clamping mechanism 1 for receiving a web W of a brake shoe to be welded; a body 2 having a rotatable part 3 attached to the clamping mechanism 1 and a stationary part 4; a rotatable clamp actuator 5 disposed within the body 2 and operatively connected to the clamping mechanism 1; an electrode 6 arranged to engage the platform P of the brake shoe; and a drive arrangement 7 for rotating the rotatable part 3 of the apparatus.

In operation, the web is clamped in the clamping mechanism 1 and the platform P is held in contact with the web by the electrode 6 at a welding station. The clamping mechanism 1 is rotated relative to the electrode 6 and current is intermittently passed through the body 2 to the clamping mechanism 1 and through the web and platform, which has preformed projections thereon, to the electrode to projection weld the web and platform together.

The apparatus will now be described in more detail. The stationary body part 4 is mounted on a base 10 and has an intermediate portion 11, an annular right hand end portion 12 and a left hand end portion 13 secured to the intermediate portion by bolts 14. The intermediate portion 11 is recessed to receive bearings 15 supporting the rotatable body part 3 and held in place by lock nuts 16 screwed on to the rotatable part 3. The intermediate portion 11 is electrically insulated from the remainder of the current transmitting part of the body by insulation material 17, except along a cylindrical gap or chamber 18 between the intermediate portion 11 and the rotatable part 3, the gap 18 containing mercury which conducts electricity across the gap. Annular seals 19 are located at the ends of the gap.

The clamping mechanism 1 comprises a fixed base plate 21 secured to the left hand end of the rotatable part 3 by bolts 22. An annular locating member 23 for axially locating the web is mounted in a recess 24 on the outer circumference of the plate 21 to prevent escape of water from cooling passage 43A, and a locating member 25 for radial location of the web is mounted in a recess 26 on the inner circumference of the plate 21. A cam ring 51, the purpose of which will be fully described hereinafter, is secured to plate 21 by bolts.

A clamping head 27 is movable axially of the plate 21 and is supported at the ends of piston rods 28, 28A which extend through the plate 21 and through the radial locating member 25. The pistons 28, 28A form part of the clamp actuator described in more detail below. The clamping head 27 comprises two generally semi-circular parts 27A, 27B respectively connected by bolts 29 to two semi-annular locating members 30, 30A each arranged to axially locate a web, so that the clamping head 27 can clamp two webs simultaneously. The locating members 23, 25, 30, 30A define recess 31, 32 within which the webs are clamped. The locating members or the complete clamping mechanism can be easily removed and replaced by members of different sizes to accommodate webs of different sizes or configuration.

The upper and lower parts of the actuator are similar and only the upper part will be described. The elements of the lower part have been allotted the same reference numerals as the upper part, but with the suffix A.

The piston rods 28 of the clamp actuator carry respective pistons 33 slidable within cylinders 34 in a cylinder housing 35. Two pressure lines 36 are connected respectively to opposite sides of each piston. All the pressure lines 36, 36A are connected to a hydraulic pump or accumulator through a rotatable joint 37 mounted at the right hand end of the apparatus.

The clamp actuator is electrically insulated from the base plate 21 of the clamping mechanism by insulators 38, and the cylinder housing 35 is insulated from the current transmitting means by a Teflon coating at 40.

The drive arrangement comprises a pulley 39 keyed to the rotatable body part 3 and driven by a toothed belt 41 from a drive motor (not shown). A pulley 39A is connected through a belt 41A to a control mechanism (not shown) which ensures that the delivery of a current pulse coincides with the alignment of a projection on the platform with the upper electrode 6.

Cooling water is supplied to the clamping mechanism through an inlet (not shown) to elongate passageways 43 extending through the rotatable part 3 from the right hand end thereof and through the plate 21 of the clamping mechanism 1, along an annular channel 43A adjacent the locating member 23 and through an outlet opening 43B (FIG. 1).

The electrode 6 comprises a wheel 44 freely rotatable about an axis parallel with the axis of rotation of the clamping mechanism 1 and biased toward the clamping mechanism. Preferably, a limit switch (not shown) is provided to switch off the current if the travel of the wheel exceeds a predetermined distance, for example if no platform or web is present.

In operation one pair of cylinders, say the upper pair 34, is pressurized to move the pistons 33 to the left and axially separate the associated part 27A of clamping head 27 and the fixed plate 21. A web is fed into the recess 31, either manually or preferably automatically, and rests on and is radially located by the locating member 25. Fluid pressure is then released from the right hand side of pistons 33 and applied to the opposite side to move the pistons to the right and clamp the web between the axial locating members 23, 30. The rotatable parts of the apparatus are rotated by the drive mechanism continuously and at a steady speed and the platform is fed into the apparatus, either manually or automatically, as will be described later, and correctly aligned with the web.

The electrode wheel 44 moves towards the clamping mechanism and holds the platform in engagement with the web and rotates with the clamping mechanism.

Electric current is passed intermittently from a transformer (not shown) to the stationary part 4, through the annulus of mercury in the gap 18, the rotatable part 3, the plate 21 of the clamping mechanism 1, the web W and the platform P to the electrode-wheel 44 to projection weld the web and the platform together. Any desired pattern of welding can be made depending on the positioning of the projections on the platform, timing of the intermittent current pulses and the rotatable speed of the clamping mechanism.

While the shoe is being formed in one half of the clamping mechanism, the preceding finished web/platform combination can be released from the other half and another web can be fed into and clamped in that other half in readiness for welding to another platform and so on.

Preferably, the platform is fed into the apparatus as a flat plate and arcuately formed to follow the web contour during the welding operation.

The electrically conducting intermediate portion 11 and rotatable part 3, the base plate 21, and the axial locating member 23 are preferably all made of copper or a copper alloy. The locating members 30, 30A are preferably of carbon steel and the clamping head 27 and the piston rods 28, 28A of stainless steel.

The mercury in the annular gap 18 is preferably fed from a header tank which also acts as an expansion tank. Alternatively, the mercury may fill only a part of the gap 18, provided there is a sufficient area of contact between the mercury and the rotatable and non-rotatable parts.

The form of apparatus shown in FIGS. 6 to 11 is generally similar to that described above and the same reference numerals are used to denote corresponding parts. Only the main differences of the apparatus are described in detail below.

In this form of apparatus the clamp actuator comprises two slides 52, 52A secured respectively at their ends to the parts 27A, 27B of the clamping head. The parts 27A, 27B are preferably formed of a thermoplastics material which prevents the transmission of current to the slides 52, 52A, and have metal backing members 53A, 53B. The radial locating member is formed in two semi-annular parts 25, 25A.

The slides 52, 52A are axially movable within a rotatable bush 50 which has an external cylindrical electrical insulation 17A which insulates the slides from the rotatable body part 3.

The clamp actuator is formed in two identical parts to actuate respective parts of the clamping mechanism independently of each other. Only the upper actuator part is described in detail below. The slide 52 is semi-cylindrical and is positively located by a key coupling the slide for rotation with the rotatable bush 50 which is in turn keyed to rotatable part 3. The slide 52 is connected to a push rod 54 by a ball joint or spherical bearing connection 55 (FIGS. 10 and 11) comprising an outer bearing part 56A secured to the rod 54 and an inner part 56B mounted on a pin 57 located in the slide 52, the bearing parts having co-operating part spherical surfaces. The other end of the push rod 54 has a ball joint or spherical bearing connection 58 (FIGS. 8 and 9) with a piston rod 59 having a piston 60 located intermediate its ends and working in a cylinder 61 formed in a housing 62 secured to the rotatable part 3 by studs 63 and electrically insulated by insulation 17. The housing 62 is rotatably mounted in a sleeve 64 having annular chambers 65, 66 communicates with respective chambers 67, 68 on either side of the piston 60 for supplying pressure fluid to the chambers 67, 68.

The outer end of the piston rod 59 extends from the housing 62 and has an adjustable stop 69 formed by a nut and a lock nut screw threadedly connected to the piston rod and engaging the end of the housing. By adjusting the stop 69, the stroke, of piston 60 can be adjusted to control the degree of opening of the clamping mechanism, to accommodate different web thicknesses and to control the timing of the clamping mechanism during operation as well as to accommodate wear of the jaws.

In operation, a web is fed into one part of the clamping mechanism to be radially located by the locating member 25 and fluid pressure is applied to the left hand side of piston 60 to clamp the web. The rotatable parts of the apparatus are continuously rotated by the drive belt 41 and a platform is fed laterally between a wheel 44 of the electrode. The operation is then the same as for the form of apparatus of FIGS. 1 to 5 until the welding operation is completed. After the welding operation the finished shoe is released by applying fluid pressure to the right hand side of piston 60.

The apparatus is cooled by passing water through passages 74, 75 extending longitudinally of the apparatus, the supply of water to the clamping mechanism 1 through passages 75 being separate from the supply for the passage 74 to provide independent temperature control of the two parts of the clamping mechanism. In this apparatus the water passes back through a passage 76 through portion 13 of the stationary body part 4 and through an outlet (not shown).

The piston and cylinder arrangement is not affected by heat to an undesirable extent since it is located remote from the clamping mechanism at the opposite end of the apparatus.

The above-described apparatus has the advantage that assembly is relatively easy since the hydraulically operable actuator 5 can be assembled separately from the clamping mechanism and simply bolted on to the rotatable part 3. Further, because two semi-cylindrical slides are used the axially movable parts subjected to bending can be made strong and are well supported so that they easily withstand the bending moments acting on them.

Figure 12:
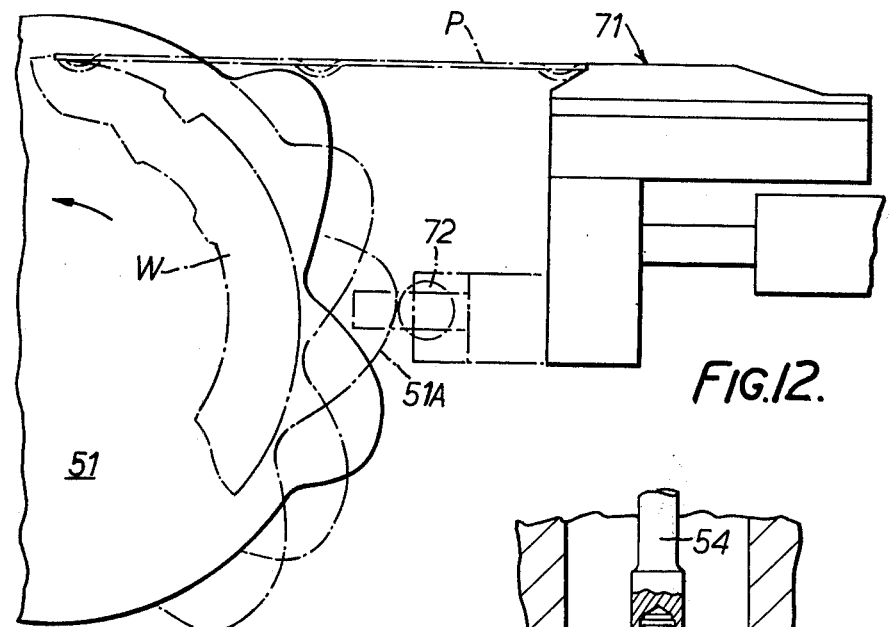
FIG. 12 is a schematic view of a platform feeding mechanism.
Figure 9:
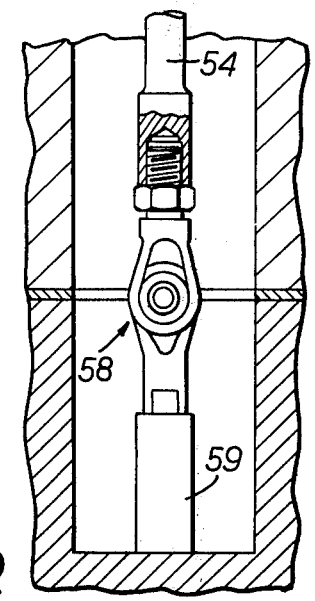
FIG. 9 is a detail plan view, partially in section, of the connections shown in FIG. 8.
Figure 8:
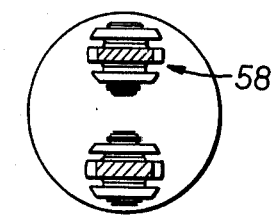
FIG. 8 is a detail section taken on the line VIII—VIII of FIG. 6 and showing connections between adjacent piston rods and push rods.
Figure 10:
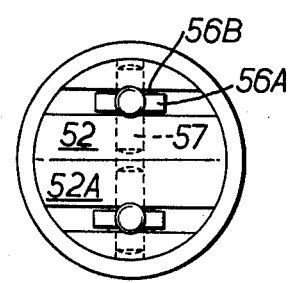
FIG. 10 is a detail section taken on the line X—X of FIG. 6, and showing connections between the push rods and a slide.
Figure 11:
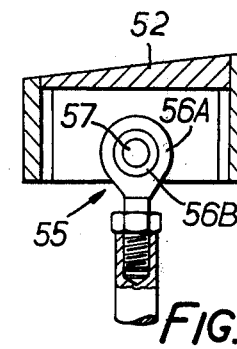
FIG. 11 is a detail partially in section of one of the connections of FIG. 10.

Both the above-described forms of apparatus may be used with the hydraulically-operated platform feed mechanism 71 illustrated in FIG. 12. The mechanism has a roller 72 which follows the surface 51A on cam ring 51, which is shown in different angular positions in FIG. 12, as the web W is rotated. The surface 51A is so contoured that the platform P is properly located relative to the web and is fed at the same speed as the web.

An advantage of the above-described apparatus is that access is always available at one side of the apparatus for the easy removal of the finished components, which may be done automatically.

Although described above in their application to the forming of brake shoes, it will be appreciated that the forms of apparatus could be used for welding together other similarly shaped components. Furthermore, the forms of apparatus may be simply modified to provide continuous welding associated with strip feeding of material into the apparatus.

What we claim is:

1. A welding apparatus for welding together a platform and an arcuate web, comprising rotatable web clamping means including an axially fixed first clamp part and a second clamp part defining a recess therebetween, said second clamp part being axially movable to clamp a web in said recess between said parts, means for passing an electrical current to said web through one of said parts, and clamp actuating means rotatable with said web clamping means for axially moving said second clamp part, said actuating means being located on the same side of said recess as said first clamp part and extending there through, said actuating means comprising one or more fluid pressure operable devices rotatable with said web clamping means, each said device including a cylinder, a piston working in said cylinder, and a piston rod secured to said piston and to said second clamp part.

2. An apparatus according to claim 1, including drive means arranged to continuously rotate said clamping means.

3. An apparatus according to claim 1, wherein said second clamp part comprises two independently operable members for clamping respective webs.

4. An apparatus according to claim 1, wherein said first clamp part is rotatably mounted in an axially fixed, non-rotatable support.

5. An apparatus according to claim 4, wherein said support includes means defining passageways therein for the circulation of cooling liquid.

6. An apparatus according to claim 1, including an axially slidable slide member connected to said second clamp part, and a connecting member connected between both said slide member and its associated piston rod and having universal connection therewith.

7. An apparatus according to claim 1, wherein said electrode comprises a roller which is rotatable about an axis parallel with the axis of rotation of said clamping means.

8. An apparatus according to claim 7, wherein said means for passing electrical current to said web comprises a fixed body part and a rotatable body part.

9. An apparatus according to claim 8, including a mercury bath between said body parts permitting the passage of electrical current between the parts.

10. An apparatus according to claim 1, including adjusting means having means for adjusting the stroke of the piston in its cylinder to vary the width of said recess.

11. An apparatus according to claim 1, including adjusting means for adjusting said clamping means to vary the width of said recess.

12. An apparatus according to claim 1, including feed means for feeding a platform between said electrode and said clamping means at the same speed as the periphery of the clamping means and tangentially to the clamping means.

13. An apparatus according to claim 12, wherein said feed means comprises a cam member formed on said clamping means for rotation therewith and defining a cam surface, a follower engaging said cam surface and movable laterally of the clamping means, and a support for a platform connected to said follower, whereby movement of said follower controls the feed speed of said platform.

* * * * *